United States Patent
Labriola, II

[19]

[11] Patent Number: 5,977,737
[45] Date of Patent: Nov. 2, 1999

[54] DIGITAL MOTOR DRIVER CIRCUIT AND METHOD

[76] Inventor: Donald P. Labriola, II, c/o QuickSilver Controls, Inc., 712 Arrow Grande Cir., Covina, Calif. 91722

[21] Appl. No.: 09/150,263

[22] Filed: Sep. 9, 1998

[51] Int. Cl.⁶ .................................................. G05B 11/28
[52] U.S. Cl. ........................ 318/599; 318/560; 318/567; 318/569; 318/600
[58] Field of Search .................................. 318/399, 560, 318/567, 569, 600

[56] References Cited

U.S. PATENT DOCUMENTS

| | | | |
|---|---|---|---|
| 4,808,895 | 2/1989 | Fujita et al. | 318/599 |
| 4,829,219 | 5/1989 | Penkar | 318/567 |
| 4,908,556 | 3/1990 | Daggett et al. | 318/569 |
| 5,428,470 | 6/1995 | Labriola, II . | |
| 5,485,071 | 1/1996 | Bi et al. | 318/700 |
| 5,710,499 | 1/1998 | Carvajal . | |
| 5,801,770 | 9/1998 | Paff et al. | 318/700 X |
| 5,838,127 | 11/1998 | Young et al. | 318/569 X |

OTHER PUBLICATIONS

IXYS Semiconductor, Data Sheet for IXMS 150, (1997).
SGS—Thomson Microelectronics, Data Sheet for L297, L297D, Aug. 1996.
SGS—Thomson Microelectronics, Data Sheet for L298, May 1995.
SGS—Thomson Microelectronics, Data Sheet for L6201—L6201P, L6202—L6203, Jul. 1996.
SGS—Thomson Microelectronics, Data Sheet for L6219, Sep. 1995.
SGS—Thomson Microelectronics, Data Sheet for L292, Mar. 1993.

*Primary Examiner*—Karen Masih
*Attorney, Agent, or Firm*—Loeb & Loeb, LLP

[57] ABSTRACT

An all digital control method for motor drivers eliminates physical motor current sensing. The motor and the driver are modeled to estimate the actual current and the estimated current is used to perform motor control. This provides simplified driver circuitry. Driver non-linearity due to driver dead time may be compensated and minimum driver on times are accommodated while providing good waveform fidelity, minimized motor heating and increased motor system damping.

15 Claims, 7 Drawing Sheets

DIGITAL MOTOR DRIVER CIRCUIT AND METHOD

BACKGROUND OF THE INVENTION

1. Field of the Invention

This invention relates generally to motor control circuitry and, more specifically, to digital circuitry suitable for controlling motor winding currents in servo motor systems.

2. Discussion of the Related Art

Applications in which objects are moved or positioned under computer control, or according to commands produced by any sort of digital processing system, generally use motors coupled to a digital control system to effect that movement or positioning. Appropriate combinations of digital control signals, driver circuits, and motors can provide highly accurate rotations or rotational velocities so that the motor systems are suitable not only to provide highly accurate positioning but also highly accurate and reproducible velocities. Driver circuits for motor systems receive digital control signals and produce driving signals, typically square waves, to be applied across the windings of the motor. The accuracy of these motor systems is obtained by the driver circuits using feedback from the motor as to the motor position and through the high degree of control of the amplitude and timing of current signals that can be supplied to the windings of the motor. Particularly useful motors for these digitally controlled motion or positioning applications include two or three phase, permanent magnet motors.

Figure 1:
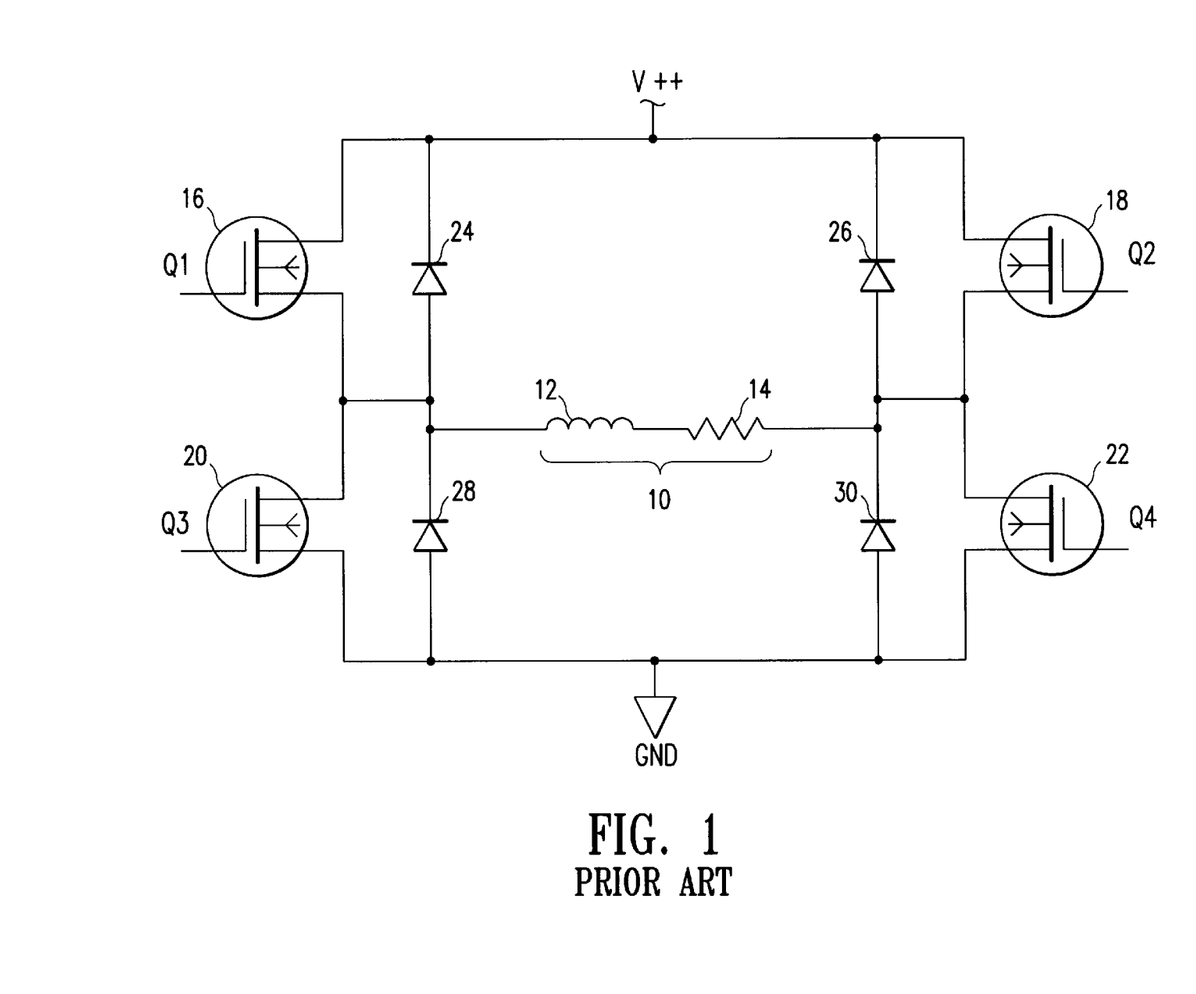
FIG. 1 illustrates conventional aspects of a full bridge driver driving one coil of a motor.

An example of a portion of a conventional motor and motor control system is illustrated in FIG. 1. The illustrated motor might, for example, be a two-phase permanent magnet synchronous motor indicated in the figure by a single, isolated winding of the two-phase motor. Although the following background discussion is made in terms of a two-phase motor system, aspects of the present invention are believed to provide advantages when applied to the operation of other types of permanent magnet motors and in particular when applied to three-phase motors. One winding or coil 10 of the motor is indicated in FIG. 1 and is modeled as including an inductance 12 and a resistance 14 in series with the inductor.

The illustrated motor and driving circuit has a configuration generally referred to as an "H-bridge" in which a half-bridge is provided on either end of the winding 10 so that both ends of the coil 10 are driven by a half-bridge. Each half-bridge can drive both positive and negative voltages using an upper switching element 16, 18 and a lower switching element 20, 22. In the illustrative example the switches 16–22 are MOS field effect transistors ("MOSFETs"), although other types of switches including bipolar transistors are sometimes used in the illustrated H-bridge driving circuit. Each of the switches has a diode connected across the terminals of the switch. The catch or commutating diodes 24, 26, 28, 30 provide a parallel current path for the corresponding ones of the switches to catch the inductive spike output from the coil 10 that occurs when one of the switches of the half-bridge opens prior to the opposing switch closing.

One mode of operation that illustrates a function of the catch diodes can be shown beginning with the FIG. 1 H-bridge in a state with switches 16 and 22 switched on so that current flows from right to left through the coil 10. When switch 16 is switched off, the current flowing through the coil starts to decrease, reducing the magnetic flux within the coil. As this begins, the voltage at the junction indicated by 32 in FIG. 1 begins dropping rapidly. When the voltage at junction 32 falls to the point that diode 28 is forward biased, current begins flowing from ground through the catch diode 28, through the motor winding 10, through switch 22, and back to ground. After a period of dead time of the driver circuitry, switch 18 is turned on. The comparatively low on-state voltage of switch 18 in its on state causes the current flowing through the motor winding 10 to flow through the switch 18 and turns the diode 28 off. The current flowing from ground, through the lower half of the bridge (switch 20 or diode 28), through the motor winding 10, back through the lower right half of the driver (switch 22 or diode 30), and back to ground is referred to as "recirculating," since the current flows in a circle. In a recirculating mode of operation, transistors 16 and 18 are switched on while transistors 20 and 22 are off, or the inverse is true. It should be noted that the current does not recirculate indefinitely in these embodiments. The resistance of the driver and winding causes the magnitude of the current to gradually decay, although this is generally slow with respect to the chopping frequency.

There are a variety of different prior art methods for controlling the current through the motor winding 10. Typically these method rely on a measurement of the current passing through the motor winding to provide feedback on the operation of the motor. The measurement of the current through the winding may be made either directly through the winding itself or as the current flows through one or more of the switches (16–22 of FIG. 1). Methods for measuring the current include the use of current sensing resistors, magnetic field sensors, and current transformers at the switching element. For the purposes of illustrating the background of the present invention, the following discussion will emphasize switched mode current control.

Switched mode current controllers include those that use peak-sensing with recirculation, those that use peak sensing without recirculation, and others that use anti-phase methods. The drivers that use peak sensing with recirculation to control the motor current apply the supply voltage to the winding until the sensed winding current exceeds the desired threshold. The winding is then effectively short-circuited until it is time for the next power addition cycle. The next power additional cycle may be initiated following a fixed off time, as is characteristic of a variable chopping frequency drive, or at a fixed repetition rate for a fixed chopping frequency drive. These types of drives are effective for putting power into the motor winding, but are not effective in removing the power. Further discussion of these drivers and their problems are provided in U.S. Pat. No. 5,710,499 to Carvajal, "Step Motor Control Circuit and Method." As stated in U.S. Pat. No. 5,710,499, drivers that use peak sensing with recirculation current control are known to reduce power output of stepper motors at higher speeds.

Conventional control methods, including the method of U.S. Pat. No. 5,710,499, are also not effective in deceelerating loads in which the motor is primarily acting as a generator. It may be desirable to use a stepper motor as a generator to brake and slow the motor, significantly improving the ability of the motor to be stopped.

A further drawback of the fixed frequency recirculating control method is that the method provides very poor control of the motor when the motor winding current is near zero. The minimum on time of the switch circuit divided by the fixed chopping period sets a minimum duty cycle at which the driver may operate, as reflected in Equation 1. The minimum on time may result in significant minimum currents, which in turn may result in large crossover distortion as the current switches from a positive to a negative value within the bridge driving circuit. This in turn may not allow for accurate position or torque control of the motor attached to the control circuit.

$$V_{Minimum} = V_{Supply} \cdot T_{Minimum}/T_{cycle} \quad (1)$$

As discussed above, various designs using a recirculation mode of operation have drawbacks which reduce their desirability. The recirculation mode of operation, on the other hand, does minimize the magnetic losses of the motor by minimizing the Root Mean Square (RMS) amplitude of the applied voltage waveform. A low RMS voltage is achieved for the circuit because the winding voltage (i.e., the voltage across the motor winding) is approximately zero volts except for when power is being added to the motor winding. For the same reason, the recirculation modes of operation also limit the ripple current in the motor windings.

Drivers that use a peak sensing, non-recirculating mode of operation apply the power supply voltage to the winding until the desired current level has been exceeded, and then switch off all switches in the bridge, allowing the current to flow through the catch diodes until the following cycle. This mode of operation is capable of rapidly transferring power from the motor windings back to the power supply rail, and of controlling currents near zero, but it still has significant crossover distortion as the current changes from positive to negative within the bridge. The peak-sensing, non-recirculating mode of operation also produces significant motor heating due to the large AC component of the applied winding voltages and the large winding ripple currents, and the peak controlled current is often significantly different from the average current desired within the motor winding.

Yet another type of motor current control is the anti-phase method. The anti-phase method of control switches only between the forward voltage (switches 16, 22 on) and reverse voltage (switches 18, 20 on) during operation. The IXMS-150 manufactured by IXYS Corporation is a good example of a part that operates in this mode. Anti-phase operation provides excellent four-quadrant control of current, delivering power to the motor in a desirable manner and desirably facilitating use of the motor as a generator when decelerating a load. The anti-phase mode of operation exhibits good control of motor winding currents near zero while maintaining fairly low cross over distortion. On the other hand, motors operating in accordance with an anti-phase mode of operation may suffer from high ripple currents and magnetic losses in the motor, which tend to heat the motor. Other disadvantages of the anti-phase mode of operation include the fact that the current control loop must be tuned for the particular motor windings, and the requirement of current sensing.

Of the three control modes discussed, motors operating according to the anti-phase method exhibit the lowest crossover distortion. The driver stage illustrated in FIG. 1 generates a significant cross over distortion due to the dead-times associated with the finite switching times of the switches. The effect will be discussed in the following for a full switching cycle (high to low and back to high) for both possible current directions.

Referring again to FIG. 1, the first analysis is taken with current flowing through the motor winding 10 from left to right, with emphasis on the half bridge consisting of switches 16, 20 and diodes 24, 28 driving the motor winding 10. At the beginning of this analysis, the upper switch 16 is conducting for an active high period. When this period ends, switch 16 is switched off. Current continues to flow left to right through the inductor 12, necessarily flowing up through diode 28, since diode 24 is reverse biased and non-conductive. After the crossover delay, switch 20 begins conduction and diode 28 switches off. After the lower switch 20 has conducted for the commanded low period, it is switched off. With the current flowing from left to right, then diode 28 must begin conducting to carry the current. After the dead time period, the upper switch 16 begins conduction and the lower diode 28 stops conducting. In this case, the low period of the left half-H bridge (16, 20, 24, 28) as seen by the motor winding 10 is extended by the cross over delay beyond the period dictated by the controlling pulse width.

The second analysis with current flowing from right to left will show that the upper diode 24 will conduct during the two dead-time periods, enhancing high period of the output voltage. The direction of the enhancement subtracts from the nominal duty cycle of the driver causing significant crossover distortion. In conventional systems, this distortion may be reduced by use of negative feedback in the current control loop, necessitating current monitoring in conventional motor control systems. In such conventional systems, the feed-forward portion of the control loop does not handle this cross over distortion.

Conventional methods of motor control systems thus suffer from high cost, complexity, and/or heat production caused by the need to measure the current. Conventional methods may further be undesirable in that they do not simultaneously have good four quadrant current control while limiting ripple current and magnetic losses in the motor.

SUMMARY OF THE PREFERRED EMBODIMENTS

It is consequently an object of the present invention to provide an improved control system that addresses undesirable aspects of conventional motor controllers.

An embodiment of the present invention provides a servo motor system with output driver circuitry for driving coils of a motor, the driver circuitry responsive to control signals. The system also includes pulse width modulation (PWM) logic circuitry coupled to the driver circuitry and producing the control signals, where the PWM logic circuitry is responsive to command codes. Motor position feedback circuitry produces a signal indicative of motor position information. A digital processor is coupled to the PWM logic circuitry and to the motor position feedback circuitry, the digital processor unit generating the command codes. The digital processor determines a motor current through modeling based on characteristics of the motor and of the output driver circuitry, and based on motor position information so that the digital processor can predict the motor current without sensing the motor current.

Another embodiment of the invention provides a servo motor system having output driver circuitry for driving coils of a motor to predetermined potentials responsive to control signals and pulse width modulation (PWM) logic circuitry coupled to the output driver circuitry. The logic circuitry produces the control signals in response to command codes, the control signals being programmable pulse width signals. A digital processor is connected to the PWM logic circuitry. The pulse widths of the control signals are adjusted in response to signals from the PWM logic circuitry to compensate for driver dead time as a function of the polarity of winding current.

Another aspect of the present invention provides a switched mode driver, where the switched mode driver includes output driver circuitry for driving an inductive load to predetermined potentials in response to pulse width control signals and logic circuitry coupled to the output driver circuitry which produces the pulse width control signals in response to commanded output voltages. The pulse width of an output from the output driver circuitry is adjusted to pre-compensate for driver dead time as a function of the polarity of winding current.

Still a different aspect of the invention provides a servo motor system with output driver circuitry for driving coils of a motor to predetermined potentials in response to control signals and pulse width modulation (PWM) logic circuitry coupled to the output driver circuitry. The PWM logic circuitry produces the control signals including a programmable pulse width modulation (PWM) signal in response to a command code. A digital processor connected to the PWM logic circuitry generates command codes. A motor current is determined by signals output by the output driver circuitry under control of the digital processor. The digital processor determines a slew rate of the motor current so that the slew rate of the motor current is a function of motor velocity.

Another aspect of the invention provides a power driver circuit comprising output driver circuitry providing output signals for driving an output load to predetermined potentials responsive to control signals and logic circuitry coupled to the output driver circuitry. The logic circuitry provides the control signals to the output driver circuitry to determine the pulse widths of the output signals from of the output driver circuitry, the logic circuitry responsive to command codes. A digital processor unit is connected to the output logic circuitry and the digital processor unit outputs the command codes. The output signals produce plural phases of signals including a positive phase, a negative phase and a shorted recirculation phase within a nominally fixed frequency PWM cycle.

DETAILED DESCRIPTION OF THE PREFERRED EMBODIMENTS

All of the motor control methods described above use some type of current measurement whether direct or indirect, as part of the control of the motor system. Measuring current, whether directly through the motor winding or indirectly through a switch provided in series with the motor winding, involves the addition of analog circuitry to the driver circuit. The necessary current measurement is made difficult by the variations of the motor current over the switching cycle and by the significant switching noise components also typically seen in the motor. Because sensing the motor current can be difficult, it cannot typically be accomplished using simple circuitry. For example, either peak sensing of the motor winding current or average sensing of the current is typically used to detect the motor winding currents. Errors arise in the current sensing operation regardless of the current detection technique. Peak sensing does not accurately reflect the average current level, while averaging typically results in a filtering delay, slowing the current control loop and limiting the response time of the control circuit. This may adversely affect the high frequency response of the driver circuit.

Particularly preferred embodiments of the invention perform motor control using a model of the motor and of the motor's performance characteristics. Most preferably, the model is incorporated within a digital processor within the driver circuit itself. The model is used to generate the control signals applied by the driver circuit to the motor. Due to the more flexible and complete control capabilities of preferred embodiments of the present invention, the control system achieves better and more precise control of motor functions, particularly of transient motor functions. Most preferably, the model incorporated within the digital processor predicts motor performance using a set of predetermined motor characteristics, including the motor inductance, motor and driver resistance, and the motor back-EMF value. Other motor characteristics incorporated within the model may include dynamically determined motor states, including the motor position, motor velocity, the power supply voltage, the pulse widths of the signal applied to the driver, and the last estimate of the motor current, as inputs to an algorithm in digital circuitry to determine the subsequent estimates of motor current. In this manner, preferred embodiments of the present invention provide a servo motor system.

Practice of one or more aspects of the present invention may provide various advantages, as compared to conventional motor control systems. Preferred embodiments of the present invention provide continuous four quadrant current control of current supplied to a motor while minimizing the motor's ripple current and the motor's magnetic losses. This may be accomplished in a motor control system using simplified driver circuitry that most preferably does not utilize current sensing. As current sensing, and modifying the control system according to the sensed current, requires additional, generally complex circuitry, eliminating current sensing while maintaining good motor control can significantly simplify the motor control circuitry. By simplifying the control circuitry, the driver circuit can be made smaller and the overall motor system can be made small.

Practice of preferred aspects of the present invention may provide further advantages, including reducing motor vibration by optimizing the dI/dT of the motor driver as a function of motor speed. Selection of appropriate voltage change rates for different motor speeds addresses in part a problem observed in conventional motor control systems related to the tendency that driving currents can mechanically affect motors of the type used for digital control. This is particularly advantageous if the motor is to be operated at or near a resonance of the motor or the system incorporating the motor. Particularly preferred embodiments of the invention may also increase the effective damping of the motor control system to high frequency vibrations.

Still another advantage achieved through practice of some aspects of the invention is the reduction and possible minimization of crossover distortion of the current drive in the presence of driver dead-time. These and other advantages associated with practice of one or more aspects of the invention will be illustrated and discussed in greater detail with reference to the figures. First, the discussion turns to an overview of a control system incorporating various aspects of the present invention.

Figure 2:
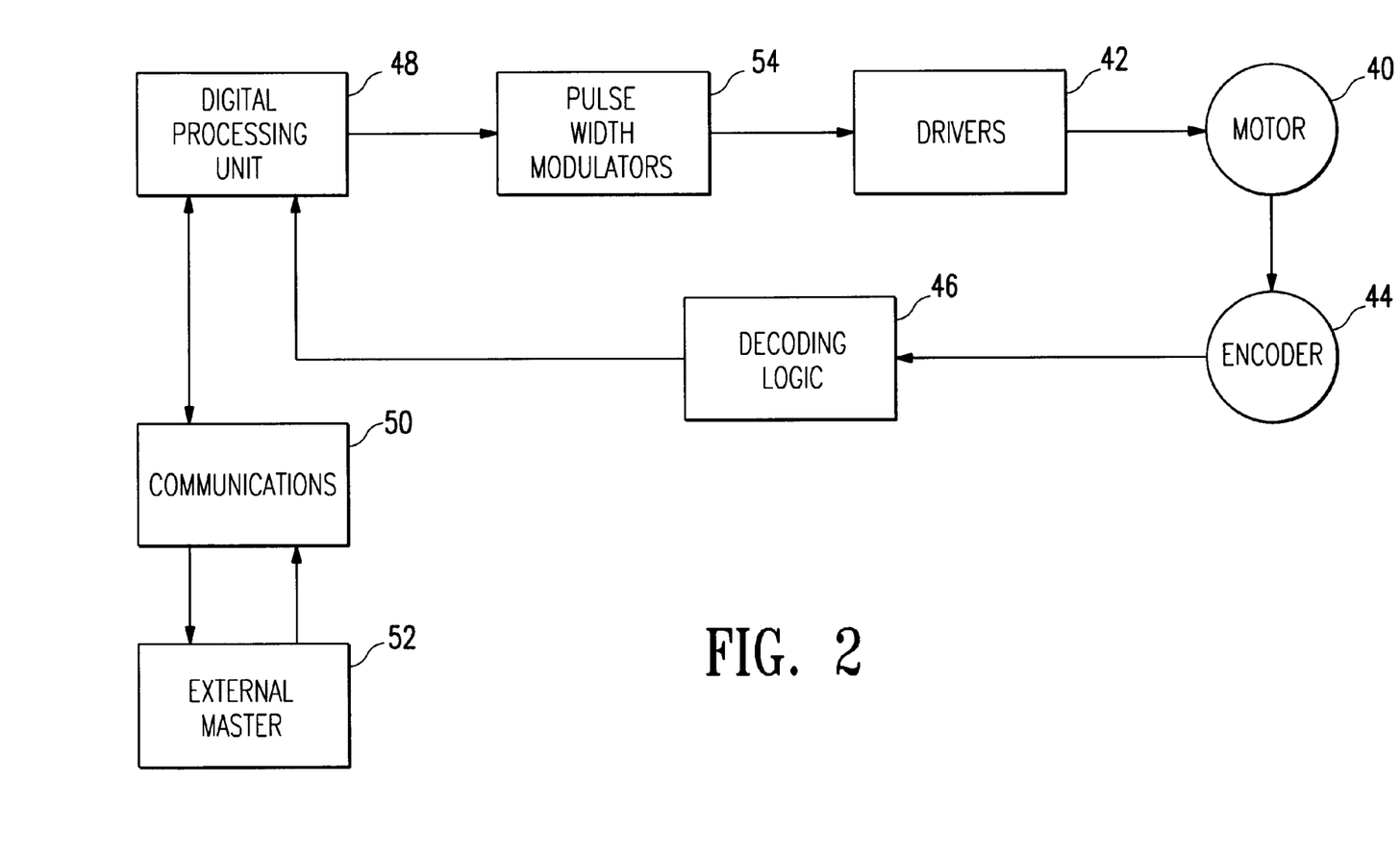
FIG. 2 schematically illustrates a motor system, including a motor controller, in accordance with preferred aspects of the present invention.

FIG. 2 presents an overview of a motor control system in accordance with the present invention. A two-phase or three-phase motor 40 is driven by the driver circuitry 42. An encoder 44, which may be an incremental encoder or an absolute encoder, is provided for the motor 40. Typically the encoder 44 is an optically readable disk or another position indicator coupled to the shaft of the motor that allows the encoder to output a signal, such as stream of pulses, characteristic of the relative or absolute position of the motor shaft. Although an encoder is illustrated, other position sensors and position sensing methods may be used, including, but not limited to, resolvers, back-EMF sensing methods, potentiometers, and position sensors using magnetic field sensing such as hall-effect devices. The output from the encoder is provided to decoding logic 46, which converts the output signals from the encoder into a format suitable for input to the digital processing unit 48. In the embodiment shown, the decoding logic 46 consists of digital filtering logic, edge transition detection logic and an up-down counter, which together convert the incremental encoder signals into position information. Those of ordinary skill will appreciate that other decoders might be used, particularly to accommodate the operation of different encoders.

Digital processing unit 48 controls operation of the illustrated motor control system using, in part, the position information provided by the encoder and decoder. The digital processing unit 48 may include a microprocessor, a microcontroller or a digital signal processor (DSP), along with non-volatile memory and logic, such as interface and glue logic, as needed. Particularly preferred embodiments use a digital signal processor such as the TMS320P14, available from Texas Instruments, Inc., in combination with one or more programmable logic arrays such as the ISPLSI 1016, available from Ilattice Semiconductor. The digital processing unit 48 is connected through a communications interface 50 to an external master 52, which might be a computer system. External communication signals are buffered and converted to digital logic levels by the communications interface 52 provided within a UART or other serial communications interface device. The communications interface device preferably incorporates one of the conventional communications protocols such as RS 232 or RS 485.

As shown in FIG. 2, the digital processing unit 48 is also coupled to one or more pulse width modulators 54 that generate the signals to be applied by the drivers 42 to the motor windings. In operation, the digital processing unit 48 calculates the required pulse width for the next processing cycle (sample period) on the basis of the motor model stored within the digital signal processing unit. Appropriate control codes are generated by the digital processing unit 48 and are provided to the pulse width modulators 54. These provide the direction and gating signals to the drivers 42. The decoding logic as well as some house keeping logic is implemented within a field programmable logic unit. In a particularly preferred implementation of the illustrated embodiment, a digital processor for the motor control system includes a digital processing unit, an onboard UART, onboard PWMs, and onboard data and program memory. Most preferably, the digital processing unit includes a digital signal processor, such as the Texas Instruments DSP identified above, having on-board non-volatile memory that stores the motor control program. Most preferably, the DSP includes at least a portion of its nonvolatile memory that is adapted so that some characteristics of a particular motor can be stored within the digital signal processor. This allows modification of the motor control program to accommodate the use of different motors through the use of fairly minor adjustments to the motor control system.

It should be appreciated that all of the various aspects of the present invention find ready application to permanent magnet motors because such motors are readily modeled. Certain aspects of the present invention can be implemented in other systems, but there may be greater difficulty with reliability in at least certain aspects of the model and may in fact be difficult to model some systems without at least some sensing of the motor characteristics.

Figure 3:
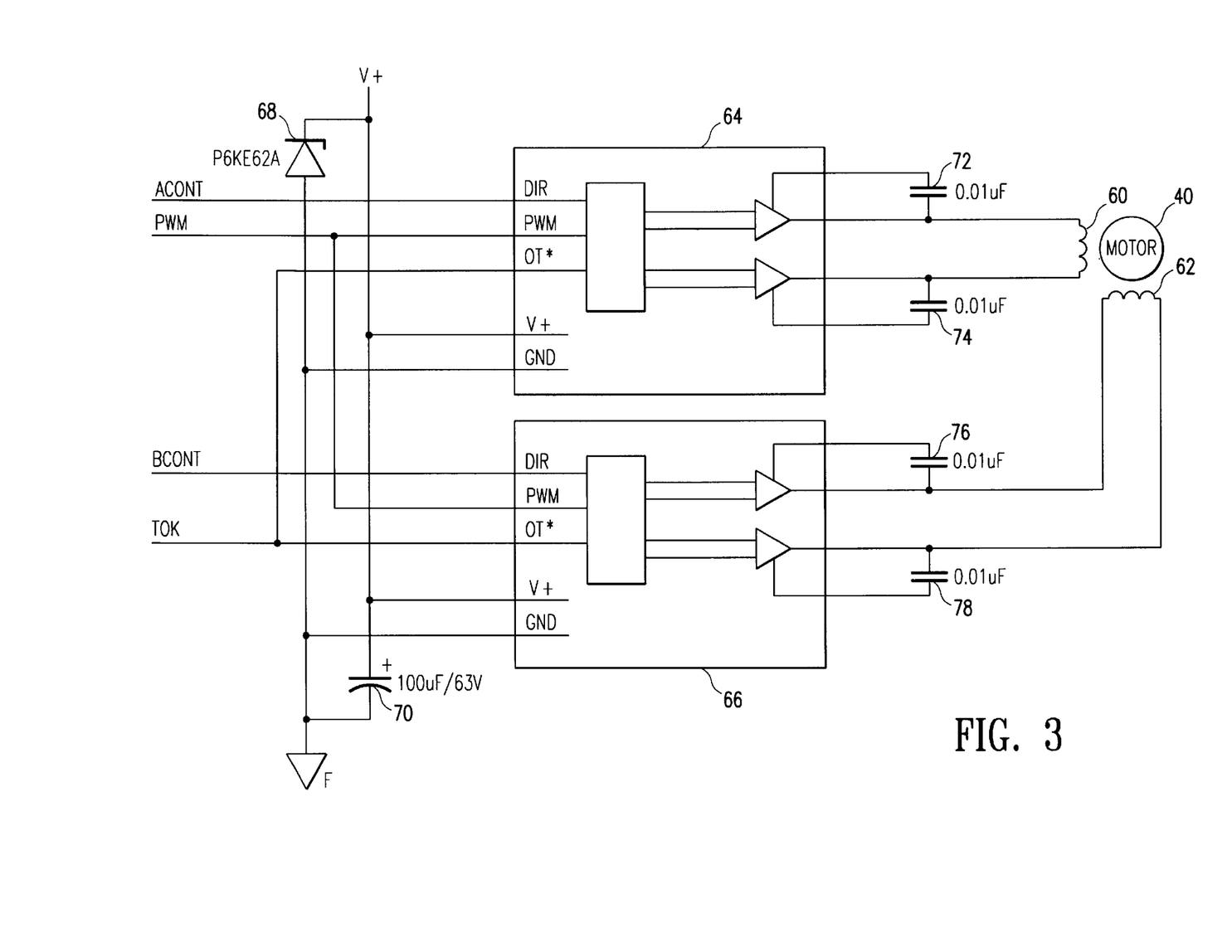
FIG. 3 schematically illustrates driver circuits that may be used in conjunction with the motor control system of FIG. 2.

Signals output from the digital processing unit 48 are provided to one or more pulse width modulators 54. The signals output from the pulse width modulators 54 and other control signals are provided to drivers 42 which generate the signals to apply to the coils of the motor. The drivers arc illustrated in greater detail within FIG. 3. Shown within FIG. 3 is a two-phase motor 40, with coils 60, 62 separated by 90°, and a pair of full H-bridge driver circuits 64, 66. The H-bridge driver circuits are, in function, similar to the circuits illustrated in FIG. 1 of the application. In practice, the H-bridge circuits 64, 66 preferably are LMD18200T parts, available from National Semiconductor. The driver circuits are provided with a power supply voltage V+and ground. Connected between the power supply voltage and ground are an over voltage Zener diode 68 (P6KE62A, SGS Thomson Microelectronics) and a filtering capacitor 70. Control signals ACONT and BCONT, preferably generated by the digital processing unit, and PWM, preferably generated by the pulse width modulators 54, are provided to the H-bridge circuits 64, 66 of FIG. 3. Each of the H-bridges generates a set of four controls signals Q1, Q2, Q3, Q4 corresponding to the four switches of the H-bridge circuit. The outputs from the four switches are combined in the manner illustrated in FIG. 1 and are provided as two outputs connected to the terminals of the motor windings 60, 62. Each of the outputs from the H-bridge circuits is provided with a corresponding pull up capacitor 72, 74, 76, 78. The H-bridge circuits 64, 66 also provide an output indicative of the motor temperature (OT*) that is provided to the DSP or other digital processing unit as a TOK signal. The digital processing unit receives this signal and can react to over temperature conditions by shutting down the motor.

Figure 4:
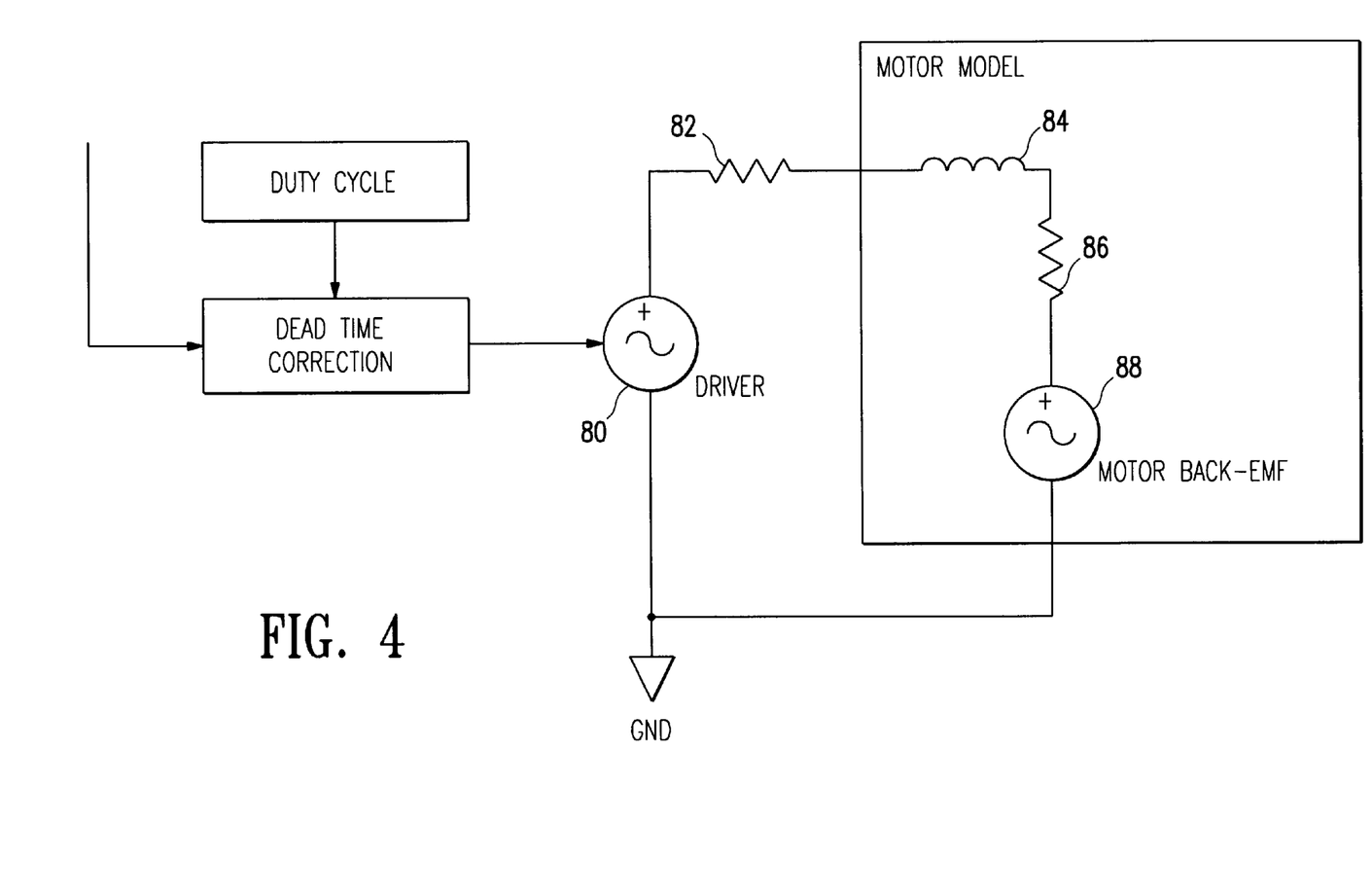
FIG. 4 schematically illustrates a model used in modeling performance of the motor and driver.

As discussed above the circuits of FIG. 3 are controlled by the circuits of FIG. 2 in accordance with a model that predicts motor currents, or other appropriate motor characteristics, on the basis of ascertainable or available motor characteristics, such as motor velocity and position. FIG. 4 schematically illustrates aspects of a model of a two-phase motor that might be implemented within the digital processing unit shown in FIG. 2 and used for controlling a motor. In FIG. 4, identification numeral 80 represents $V_D$, the open terminal voltage of the driver for the given PWM code and 82 represents $R_D$, the effective resistance of the driver bridge in FIG. 1. Internal aspects of the motor include numeral 84 representing $L_M$, the motor winding inductance, 86 representing $R_M$, the motor winding resistance, and 88 representing $V_{BEMF}$, the back-EMF generated when the motor is in motion. The conventional current notation is counter-clockwise going from 80 toward 82. In this model, taking the voltage around the loop, we get:

$$V_D = \partial(I)/\partial(t) * L_M + I * (R_M + R_D) + V_{BEAF} \quad (2).$$

Let: $R_T = R_M + R_T$. Rearranging the terms, the equation may be restated in state space format:

$$\partial(I)/\partial(t) = V_D/L_M - V_{BFMF}/L_M - I * R_T/L \quad (3).$$

The back-FMF voltage of the motor, $V_{BEMF}$, can be approximated as:

$$V_{BEMF} = \omega_M * K_{BEMF} * \sin(\Theta_M * P + \Theta_W) \quad (4).$$

Where: $\omega_M$=motor angular velocity, $K_{BEMF}$=peak back EMF per angular velocity, $\Theta_M$=motor physical angle, P=number of pole pairs in the motor, and $\Theta_W$=electrical angle of the given winding.

The reference winding of the motor will be taken as having $\Theta_W = 0$, with the second winding of a two-phase motor taken as having a 90 degree phase lag (like that shown in FIG. 3).

This equation is then converted to a discrete form corresponding to the sample time of the system, T, to give:

$$I_{(K+1)} = I_K * \exp(-T * R_T/L_M) + V_D/R_T * (1 - \exp(-T * R_T/L_M)) - V_{BEMF}/R_T * (1 - \exp(-T * R_T/L_M)) \quad (5)$$

The new estimate of the current is given by the equation $I_{(K+1)}$, the prior estimate being $I_K$, with "exp(x)" having its usual meaning of a natural base raised to the given exponent "x". The result of this calculation is used as the motor current estimate for control calculations that determine the pulse widths to be applied to various inputs to the driver circuit as a function of commanded current from a servo control algorithm.

Inspection of the discrete equation for predicting the motor current indicates that the model uses two measured inputs, the motor angular velocity and the motor physical angle. Other inputs to the calculation are characteristic of the motor itself and can be derived empirically for a given motor and readily stored in the preferred DSP including non-volatile memory. Testing of motors using this model indicates high levels of performance. The invention thus provides a dynamic estimate of the average motor current to the digital processing unit while eliminating the size, heat generation, and cost associated with other current measurement techniques.

The invention also takes advantage of the motor/driver modeling to form a feed forward current control method. Knowing the present motor currents and voltages allows the pulse widths provided to the driver to be determined such that the settling to the commanded motor current will just completed by the next sample period. In other words, the model desirably implements a trapezoidal interpolation of the command current.

Conventional current mode choppers tend to bring the motor current up to the next requested level as fast as they are able; even though this is not always beneficial. At low to medium speeds, the current levels to the motor are more preferably smoothed to approximate sinusoids. In discrete time systems, the currents must be adjusted periodically. For a conventional current controller, the requested current sine wave is sampled to produce a discrete waveform having a series of stair steps, with a digital to analog converter functioning as a zero order sample and hold circuit. The steps in the requested current are reproduced in the actual motor current, which, in turn, gives rise to steps in the motor torque produced. These steps in torque give rise to jerk impulses, $$\partial^3 \Theta/\partial t^3 \quad (6)$$

which cause noise and vibration in the motor. A current predictor takes advantage of the same motor parameters and state information as are used in the current estimator described above (Equation 5). The predictor allows calculation of the driver voltage necessary to allow the winding current to be ramped over the available time to more approximate a "first order hold." Use of such a ramp within the driver circuit can significantly reduce the noise and vibration in the system.

Further, if this settling period is made to be even larger than one sample period, a low pass smoothing filter is effectively implemented. As long as the settling time of the filter is small compared with the period of the electrical cycle of the motor, the torque will not be adversely affected. On the other hand, if the wanted current waveform, usually either a sine wave or trapezoid, is significantly altered, then motor torque will be negatively affected. In one implementation of this aspect of the present invention, the settling time of this smoothing filter is made a function of motor speed, so as to minimize the low speed vibrations without affecting high speed torque.

The calculations of the current controller to effect a variable settling rate for the smoothing function as described above are as follows. The current interpolation filter of this aspect is controlled by a factor denoted as $K_I$, the interpolation constant. The constant K may also be considered the slew rate, or time rate of change of the current. When $K_I$ is equal to 1, the current will just settle to the commanded current at the end of the sample period. When $K_I$ is 0.5, for example, the current changes one half of the difference between the current's value at the beginning of the sample period and the current's commanded value for the end of the sample period. Within the context of this aspect of the present invention, $K_I$ is most preferably made a function of motor speed, so that the interpolation constant has some minimum value at zero motor speed, and increases to 1 by an optimal motor speed, and remains at 1 for any higher speeds.

The output driver command function may be derived from the same equation that was used to calculate the current estimate, but this time solving for the driver voltage required to get the commanded current:

Let: $K_I$=the interpolation constant, $I_{(K+2)}$=the desired current, $I_{(K+1)}$=the present current, and $F_E = \exp(-T * R_T/L_M)$.

With the various units as described above in conjunction with the current estimator:

$$V_{(K+1)} = I_{(K+2)} * R_T * K_I/(1 - F_E) - I_{(K+1)} * R_T * (K - 1 + F_E)/(1 - F_E) + V_{BEMF}(7)$$

The output anti-phase duty cycle for the following sample period is consequently:

$$D_{(K+1)} = 0.5 * (1 + V_{(K+1)}/V_{++}) \quad (8)$$

Where: $V_{++}$ is the power supply voltage powering the bridge circuit. The duty cycle is most preferably also limited to the range of 0 to 1. The driver output duty cycle may consequently be distorted by the driver circuit due to the dead time, as explained above. Practice of preferred aspects of the invention may improve the accuracy of the commanded output voltage by pre-compensating the driver pulse width as described in the following.

An additional aspect of the present invention allows for compensation of driver non-linearity using an interpolation filtering of the commanded current. By using interpolation filtering, the damping of the system is increased. The desirable effect of practicing this aspect of the invention may be seen by considering the operation of the current control loop, illustrated in the model of FIG. 4, with the commanded current set to zero. The low frequency changes in the motor position are able to pass through the current control loop filtering, allowing the driver voltage to effectively track the winding voltage. This tracking makes the driver output voltage 80 effectively track the motor's back-EMF voltage 88. With no voltage across the winding's impedance 84, no current flows through the winding. At high frequencies, the action of the current control loop filtering prevents the driver voltage from effectively tracking the winding voltage. The driver impedance 82 and the winding impedance 86 effectively short the motor back-EMF voltage 88 components in this higher frequency range. The difference in winding back-EMF 88 and driver voltages 80 gives rise to winding currents that oppose the motion, enhancing the system damping.

The switched mode driver shown in FIG. 1 has a non-linearity associated with its operation that is associated with half-bridge driver dead time. The two switches, 16 and 20, for example, must not conduct at the same time, or the power supply voltage will be shunted to ground causing damage to the switches. To prevent this from happening, one of the switches must be turned off before the next switch is turned on. Since the switches take finite time to stop conducting after being switched to the off state, a "dead-time" must be incorporated into the control circuit that controls the bridge driver circuits. During the time that both switches 16, 20 in the half bridge are in the off state, one of the catch diodes 24 or 28 must carry the motor winding current until the next switch begins conducting.

Using FIG. 1, there are two possible conduction routes, one through 24 and one through 28. It may be seen that 28 must conduct if the conventional current is flowing from left to right; alternatively, 24 must carry the current if the current is flowing from right to left. The duty cycle to switch to the upper rail is thus increased by the dead time if the current if flowing from right to left, and reduced by the dead time if the current is flowing from left to right. Without compensation, this effect causes a significant cross-over non-linearity. This non-linearity is reflected in the winding current being significantly reduced in the vicinity of zero when driving the motor, and producing an exaggerated step when braking the motor.

A preferred embodiment of the invention takes advantage of knowledge of the polarity of the motor winding current to compensate for this non-linearity in the driver stage by increasing or decreasing each half-bridge duty cycle as a function of the polarity of the current. This non-linearity correction is most preferably applied to both the current estimation calculations and to the current control calculation.

Another preferred aspect of this invention combines the advantages of both the anti-phase driver technique, and the recirculating driver technique without suffering the drawbacks of either method. The anti-phase driver is able to easily operate in all four-quadrants (positive voltage, positive current; positive voltage, negative current; negative voltage, positive current; and negative voltage, negative current). In addition, anti-phase drivers have the desirable ability to operate continuously through zero volts. This capability exists due to the ability to present both positive and negative voltages to the motor winding. Thus, to produce a zero average voltage across the winding, one merely needs to make the positive and negative periods and voltages equal to each other.

The recirculating drive is unable to control currents near zero due to the minimum switching time of the driver. For example, a driver, such as the LMD18200, with a 1 $\mu$S minimum on time and a 40 kHz, 25 $\mu$S chopping rate, has a minimum duty cycle of approximately 1 $\mu$S/25 $\mu$S or 4%. Many high speed drives use power supply voltages that are significantly higher than the motor resistance times the motor steady state current. In these systems, a 4% duty cycle could easily exceed the rated current for the motor. As such, near zero operation of recirculating drives presents the possibility of motor damage. On the other hand, recirculating drives do have the advantage that the drives require minimal AC RMS voltage for the bridge driver to produce the desired average dc voltage across the windings. This is done by applying the full supply voltage for the required period, and then shorting the windings for the balance of the cycle. The lower RMS voltage reduces the magnetizing losses of the motor, which are a function of the RMS voltage across the windings. This mode of operation also has reduced ripple current.

Figure 5:
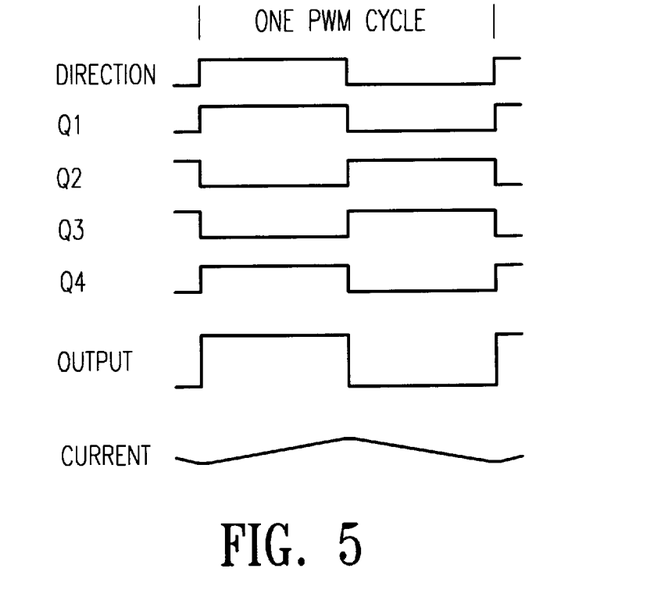
FIG. 5 illustrates performance characteristics of a conventional anti-phase driver operating near zero average current.

Preferred embodiments of the present invention may be operated in a hybrid mode dubbed "gated anti-phase." FIG. 5 shows the operation of a conventional anti-phase driver, the signal Q1 being applied to switch 16 in FIG. 1, Q2 applied to 18, Q3 applied to 20, and Q4 being applied to 22. The left half of the bridge (16, 20, 24, 28) always applies the opposite voltage to the motor winding 10 than is applied by the right half of the bridge (18, 22, 26, 30). The output voltage (measured differentially across the winding 10) is labeled as "Output" while the current through the winding 10 is labeled as "Current" . The "Direction" signal for the standard anti-phase is a PWM (Pulse Width Modulation) signal that is coupled directly to Q1 and Q4, and inverted to Q2 and Q3. FIG. 5 shows the Direction signal with a 50% duty cycle which causes a zero average output voltage and zero average output current. It may be seen that the ripple current is significant, however.

Figure 6:
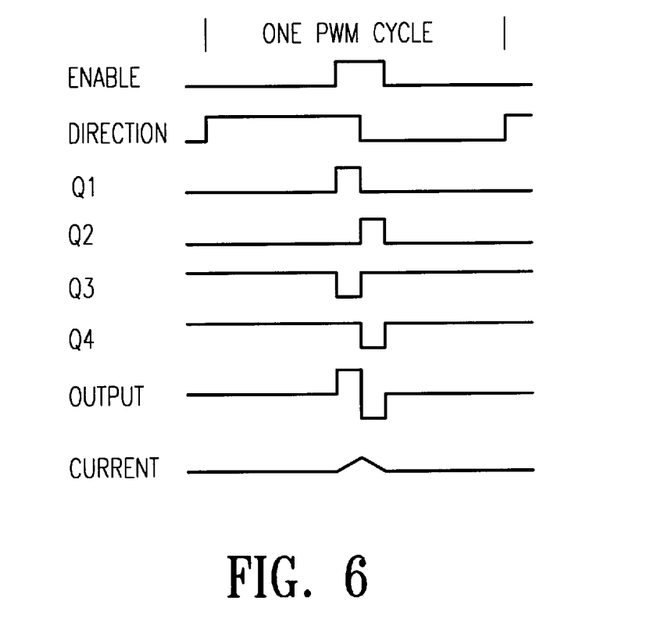
FIG. 6 illustrates performance characteristics of a gated anti-phase driver, incorporating aspects of the present invention, operating at near zero average current.

FIG. 6 demonstrates the same zero average output signal with the same 50% duty cycle Direction command. However, Q1, Q2, Q3, and Q4 have been additionally gated with an enable signal. The gating signal is implemented such that it is centered on the 50% point of the "Direction" control signal. Further the width of the gating signal is such that all of the gated signals, Q1, Q2, Q3, and Q4, have at least the minimum allowed driver pulse width present. Note that the gating of said control signals (Q1, Q2, Q3, Q4) may be implemented within an integrated driver circuit, within the PWM generator, within external logic, or implemented directly as pulses within multiple synchronized PWM generators.

In the zero output voltage case shown in FIG. 6, the positive and negative portions of the "Output" waveform are equal and cancel, as was the case in FIG. 5. However, the RMS voltage of FIG. 6 has been significantly reduced, as compared with FIG. 3, as has the amplitude of AC component of the winding current, referenced here as the "ripple current." Both of these reductions reduce the losses in the motor, improving the efficiency of the driver circuit and reducing unwanted heat generation.

Figure 7:
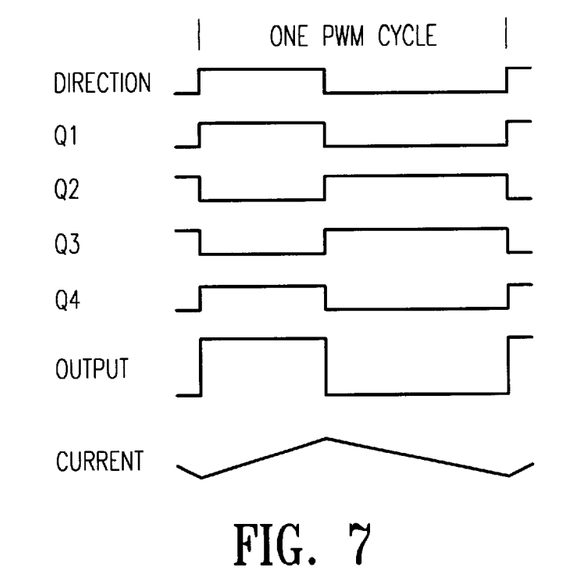
FIG. 7 illustrates performance characteristics of a conventional anti-phase driver operating at a negative average current.
Figure 8:
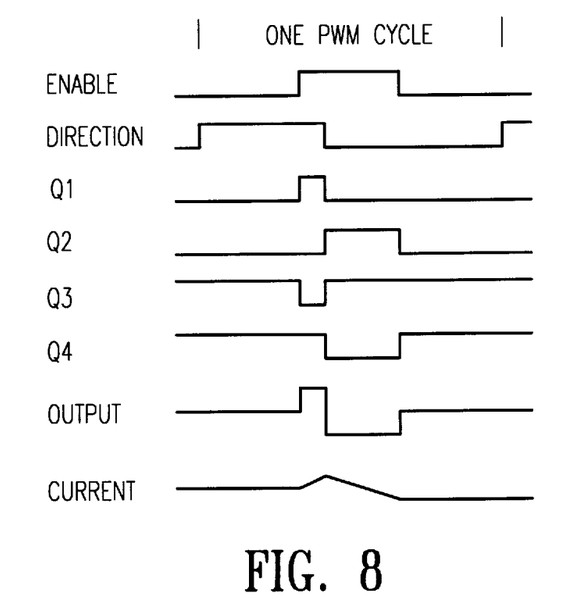
FIG. 8 illustrates performance characteristics of a gated anti-phase driver, incorporating aspects of the present invention, operating at a negative average current.

FIG. 7 illustrates the operation of the anti-phase driver as the output voltage is moved away from zero, in the negative direction in this example. FIG. 8 shows the same average output voltage operation as in FIG. 7, but with the RMS voltage and currents associated with the motor winding again significantly reduced.

Figure 9:
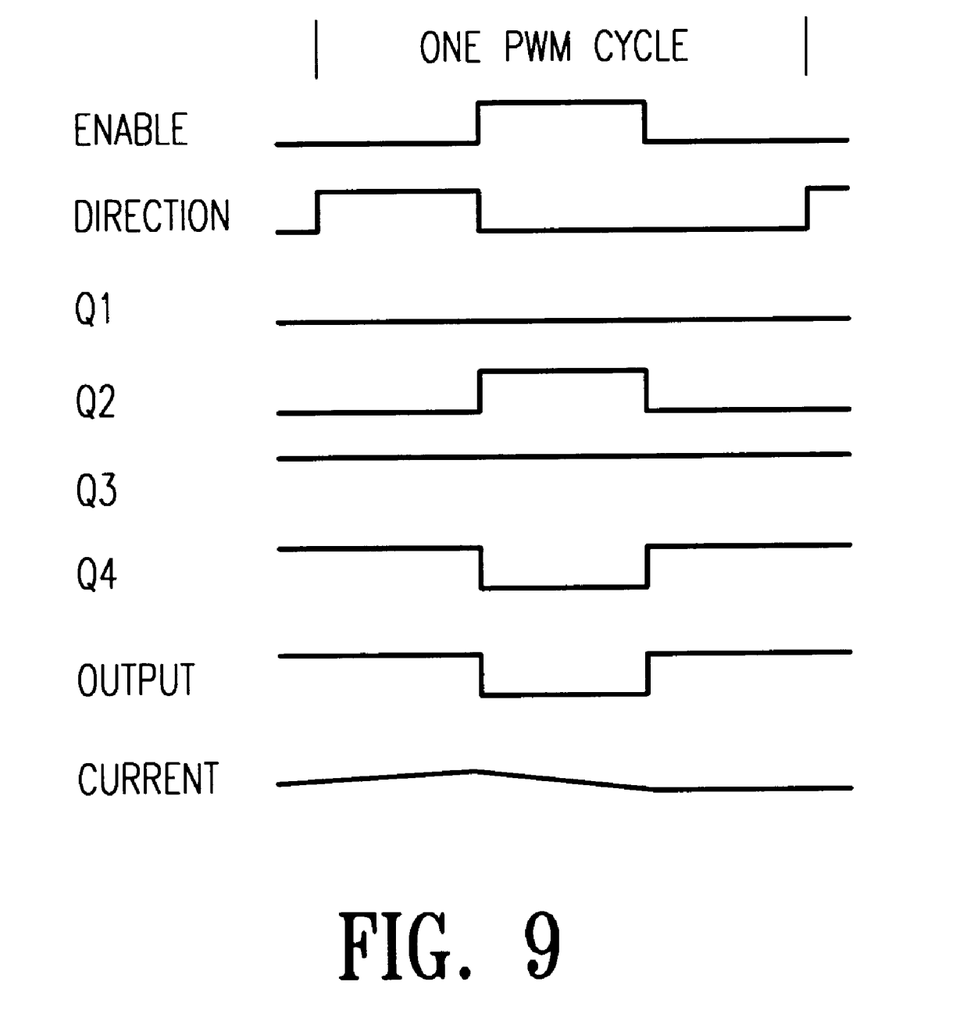
FIG. 9 illustrates performance characteristics of a gated anti-phase driver, incorporating aspects of the present invention with the reverse phase of the waveform eliminated.

FIG. 9 shows an additional enhanced mode of operation. For output voltages that are sufficiently large as to not need the anti-phase operation in order to maintain both desired output voltage and the minimum on-times of the switches, the operation reverts to the switching waveforms typical of a recirculating drive. In this case, the enable waveform is again kept symmetrical about the 50% duty cycle point of the Direction signal, but its width is set such that one of its edges coincides with the transition of the direction enable. This also maximizes the voltage available to the motor winding, as there is no canceling anti-phase portion present. This further reduces the AC losses in the motor and the resistive losses due to the ripple current, as well as eliminating the switching losses associated with the side of the bridge that did not require switching in that cycle.

The illustrated embodiment of the invention differs from a conventional recirculating motor control system in the use of knowledge about the states of the motor and its windings to determine, before the cycle begins, the direction and duration of the control pulses to be applied to the driver. A conventional recirculating driver circuit applies a positive voltage to a winding if a positive current has been requested and a negative voltage to the winding if a negative current has been requested. After the blanking time of the comparator, the current is then monitored in the conventional recirculating motor system to see if the current exceeds the commanded value. If the actual, measured current is already in excess of that value, the conventional recirculating motor system does not have an active way of removing the current, but can only short the winding and allow the current to decay. Thus, the conventional recirculating driver is only configured for two quadrant operation (positive voltage, positive current; negative voltage, negative current) and experiences the minimum duty cycle problem already described.

Finally, the enable may be reduced to zero when no output voltage is being requested. This state produces an automatic stopping of the chopper and any associated electrical and acoustic noise when the commanded motor torque and speed are both zero.

Preferred embodiments of the invention are able to support full four-quadrant operation with efficient control through and including zero voltage and current while minimizing the losses within both the motor and the driver circuits. Most preferably embodiments of the invention accomplish this without current monitoring feedback, while obtaining enhanced damping and current waveform tailoring. In addition, these preferred embodiments may be implemented in a fully digital system.

As discussed above, the current control, driver deadtime compensation, and damping aspects of this invention may be implemented in systems other than those specifically described herein. For example, most of the embodiments of this invention may be implemented in systems that have current feedback.

The present invention has been described in terms of certain preferred embodiments thereof. Those of ordinary skill in the art will appreciate that variations from the particular system described here may be made without altering the teachings of the present invention. Some of these variations are described explicitly here, while others have not been explicitly described in the interest of providing a concise description of the present invention. The present invention therefore is not to be limited to any particular embodiment described, but instead the scope of the present invention is to be determined by reference to the claims, which follow.

I claim:

1. A servo motor system, comprising:
    output driver circuitry for driving coils of a motor, the driver circuitry responsive to control signals;
    pulse width modulation (PWM) logic circuitry coupled to the driver circuitry and producing the control signals, the PWM logic circuitry responsive to command codes;
    motor position feedback circuitry that produces a signal indicative of motor position information; and
    a digital processor coupled to the PWM logic circuitry and to the motor position feedback circuitry, the digital processor generating the command codes,
    wherein the digital processor estimates a motor current through modeling based on characteristics of the motor and of the output driver circuitry, and based on motor position information so that the digital processor can predict the motor current without sensing the motor current and wherein
    the digital processor generates the command codes in response to the estimated motor current.

2. The motor system of claim 1, further comprising a motor.

3. The motor system of claim 2, wherein the motor position feedback circuitry includes an incremental encoder.

4. The motor system of claim 2, wherein the motor position feedback circuitry includes an absolute encoder.

5. The motor system of claim 2, wherein the motor position feedback circuitry includes a resolver.

6. The motor system of claim 2, wherein the motor position feedback method incorporates motor back EMF sensing.

7. The motor system of claim 1, wherein the output driver outputs signals to drive the coils of a motor to predetermined potentials.

8. The motor system of claim 7, wherein the output driver selectively outputs a positive power supply potential and a negative power supply potential.

9. A servo motor system, comprising:
    output driver circuitry for driving coils of a motor to predetermined potentials responsive to control signals;
    pulse width modulation (PWM) logic circuitry coupled to the output driver circuitry, the logic circuitry producing the control signals in response to command codes, the control signals being programmable pulse width signals; and
    a digital processor connected to the PWM logic circuitry, the digital processor generating the command codes,
    wherein the pulse widths of the control signals are adjusted in response to the digital processor to compensate for driver dead time as a function of the polarity of winding current.

10. The motor system of claim 9, wherein the pulsewidth modulation signals are characterized by a PWM duty cycle, and wherein the PWM duty cycle is increased for one polarity of a motor winding current and is reduced for an opposite polarity of the motor winding current.

11. A switched mode driver, comprising:
    output driver circuitry for driving an inductive load to predetermined potentials in response to pulse width control signals; and logic circuitry coupled to the output driver circuitry which produces the pulse width control signals in response to commanded output voltages;

wherein a pulse width of an output from the output driver circuitry is adjusted to pre-compensate for driver dead time as a function of the polarity of winding current.

12. The switched mode driver of claim 11, wherein the output driver circuitry comprises two half bridge circuits for driving one end of the inductive load, and wherein outputs of each of the half-bridges is substantially driven to either of two power supply potentials.

13. A servo motor system, comprising:

output driver circuitry for driving coils of a motor to predetermined potentials in response to control signals;

pulse width modulation (PWM) logic circuitry coupled to the output driver circuitry which produces the control signals including a programmable pulse width modulation (PWM) signal in response to a command code; and a digital processor connected to the PWM logic circuitry and generating the command code;

wherein a motor current is controlled by signals output by the output driver circuitry under control of the digital processor, the digital processor determining a slew rate of the motor current so that the slew rate of the motor current is a function of motor velocity.

14. A power driver circuit comprising:

output driver circuitry providing output signals for driving an output load to predetermined potentials responsive to control signals;

logic circuitry coupled to the output driver circuitry, the logic circuitry providing the control signals to the output driver circuitry to determine the pulse widths of the output signals from the output driver circuitry, the logic circuitry responsive to command codes; and a digital process unit connected to the output logic circuitry, the digital processor unit outputting the command codes, wherein the output signals produce plural phases of signals including a positive phase, a negative phase and a shorted recirculation phase within a nominally fixed frequency PWM cycle.

15. The power driver circuit of claim 14, wherein one or more of the phases may be selectively omitted, as a function of the command words from the digital processor.

* * * * *